(12) United States Patent
Klassen et al.

(10) Patent No.: US 8,739,071 B2
(45) Date of Patent: May 27, 2014

(54) SYSTEM AND METHOD FOR MESSAGE DISPLAY AND MANAGEMENT

(75) Inventors: Gerhard D. Klassen, Waterloo (CA); Chris Wormald, Kitchener (CA); David Yach, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 1241 days.

(21) Appl. No.: 10/787,093

(22) Filed: Feb. 27, 2004

(65) Prior Publication Data

US 2005/0193345 A1 Sep. 1, 2005

(51) Int. Cl.
*G06F 3/048* (2013.01)

(52) U.S. Cl.
USPC ........ 715/835; 715/752; 455/413; 455/412.2; 379/88.12; 379/88.11; 379/88.13

(58) Field of Classification Search
USPC ......... 379/88.13, 88.11, 88.12; 715/835, 810, 715/840, 751, 747, 752; 709/209; 707/104.1; 455/413, 412.2
See application file for complete search history.

(56) References Cited

U.S. PATENT DOCUMENTS

| | | | |
|---|---|---|---|
| 5,579,472 A * | 11/1996 | Keyworth et al. | 715/751 |
| 5,781,857 A * | 7/1998 | Hwang et al. | 455/412.2 |
| 6,571,275 B1 * | 5/2003 | Dong et al. | 709/209 |
| 6,640,239 B1 * | 10/2003 | Gidwani | 709/203 |
| 6,661,877 B1 | 12/2003 | Christofferson et al. | |
| 6,778,642 B1 * | 8/2004 | Schmidt et al. | 379/88.13 |
| 6,868,283 B1 * | 3/2005 | Bonansea et al. | 455/566 |
| 7,096,009 B2 | 8/2006 | Mousseau et al. | |
| 7,194,516 B2 * | 3/2007 | Giacobbe et al. | 709/206 |
| 7,225,409 B1 * | 5/2007 | Schnarel et al. | 715/747 |
| 7,283,808 B2 * | 10/2007 | Castell et al. | 455/413 |
| 7,295,836 B2 | 11/2007 | Yach et al. | |
| 7,603,379 B2 * | 10/2009 | Kang et al. | 1/1 |
| 7,672,879 B1 * | 3/2010 | Kumar et al. | 705/30 |
| 2003/0013483 A1 * | 1/2003 | Ausems et al. | 455/556 |
| 2003/0023688 A1 | 1/2003 | Panttaja et al. | |

(Continued)

FOREIGN PATENT DOCUMENTS

| | | |
|---|---|---|
| EP | 1484703 A1 | 12/2004 |
| EP | 1667388 A | 6/2006 |
| WO | 02103967 A | 12/2002 |
| WO | 2005115035 A | 12/2005 |

OTHER PUBLICATIONS

Search and Examination Report dated Aug. 19, 2004 from EP04251146.9.
Examination Report dated Dec. 2, 2005 from EP04251146.9.
Examination Report dated Sep. 7, 2007 from EP04251146.9.
Summons to Oral Proceedings dated Dec. 29, 2010 from EP04251146.9.

(Continued)

*Primary Examiner* — Sherrod Keaton (74) *Attorney, Agent, or Firm* — Jenna L. Wilson; Dimock Stratton LLP (57) ABSTRACT

A collating application for message display and management executes on a communication device. The communication device includes a plurality of message applications associated with various communication channels, each message application receiving and storing messages associated with one of the various communications channels. The collating application dynamically accesses messages stored by the plurality of message applications to retrieve messages that meet defined matching criteria. The collating application permits the user to select a listing of the heterogeneous retrieved messages in a single view on the communication device. Icons associated with the matching criteria are displayable and vary in accordance with the presence or absence of unread messages meeting the matching criteria.

30 Claims, 5 Drawing Sheets

(56) References Cited

U.S. PATENT DOCUMENTS

| | | |
|---|---|---|
| 2003/0026393 A1 | 2/2003 | Ng et al. |
| 2003/0120957 A1* | 6/2003 | Pathiyal ........................ 713/202 |
| 2004/0010808 A1* | 1/2004 | deCarmo ...................... 725/139 |
| 2005/0130631 A1 | 6/2005 | Maguire et al. |

OTHER PUBLICATIONS

Office Action dated Apr. 16, 2008 from CA2498112.

Office Action dated Feb. 27, 2009 from CA2498112.

Office Action dated Oct. 14, 2010 from CA2498112.

* cited by examiner

New Messages from Mary Johnson — 62
✉ 4:23 Re: running late   I'm just getting on ...

Email                         Phone — 66
✓ 4:20p Running late          ☏ 12:03p Mar 5, 03
✉ 1:02p FW: Presentation      ☏ 6:22p Mar 4, 03
📁 12:15p Re: your call
✓ 11:50 Your call             SMS — 68
                              📱 1:09p Mar 5, 03

Instant Messages
◀ He says he'll buy if I cut off another 5%
▷ Tell him you can do it if he puts in a PO for 5k more units for May.
◀ Free shipping too...
◀ I hope our margins can handle this.
▷ Way to go! Good selling on ya!

New Messages from Ma[...]
4:23 Re: running la[...] | Email Mary Johnson
Email | SMS Mary Johnson
✓ 4:20p Running late | Call Mary Johnson
⊠ 1:02p FW: Presentati | QM Mary Johnson
🖃 12:15p Re: your call | View Message
✓ 11:50 Your call | File Message
 | Delete Message
Instant Messages | Reply
▼ He says he'll buy if I | Forward
△ Tell him you can do | Etc....
for 5k more units for M | Sort Chronologically
▼ Free shipping too.... | Cancel
▼ I hope our margins ca[...] | Hide
△ Way to go! Good sel[...]

Chronological Messages from Mary Johnson
⊠ 4:23 Re: running late    I'm just getting on the bus shortly
✓ 4:20p Running late
△ 2:22p Way to go! Good selling on ya!
🖃 1:09p Mar 5, 03
▼ 1:05p I hope our margins can handle this.
▼ 1:04p Free shipping too....
⊠ 1:02p FW: Presentation
△ 12:35p Tell him you can do it if he puts in a PO for 5k more units for May.
▼ 12:32p He says he'll buy if I cut off 5%
🖃 12:15p Re: your call
🖃 12:03p Mar 5, 03
✓ 11:50 Your call

SYSTEM AND METHOD FOR MESSAGE DISPLAY AND MANAGEMENT

FIELD OF THE INVENTION

The present invention relates generally to communication systems and more specifically to a system and method for the display and management of messages in such systems.

BACKGROUND OF THE INVENTION

Communication devices, such as wireless mobile devices, are increasingly powerful and the sources of potential incoming messages are increasingly more varied. As a result, such communication devices are being designed and built to permit users to accept various different heterogeneous messages. A single communication device may, for example, accept messages sent in an e-mail format, an SMS (Short Message Service) format, a telephone voice mail format, or an IM (Instant Message) format. With such a device, the user is able to select an appropriate application running on the communication device to have any one of such messages displayed or replayed to the user.

While most individuals use a specific communication method for a specific purpose, in many cases a series of communications takes place with the same person over multiple channels. While this wide variety of communication methods gives the sender and the recipient increased choice and flexibility, it can become more difficult to simply and understandably display and manage the messages that a recipient may have received from a particular person where such messages have been received over differing communications channels.

Communication devices display and manage different types of messages using different applications executing on the devices. Consequently locating, reading, comparing, or responding to potentially heterogeneous messages typically requires a user to make use of several different applications, with potentially varying interfaces.

It is therefore desirable to provide a system and method for the display and management of communications sent using different communications methods that does not require the user to manipulate multiple applications.

SUMMARY OF THE INVENTION

Accordingly, the system and method of the present invention provide for an improved system and method for managing and displaying messages on a communication device.

According to an aspect of the invention, there is provided a method and system in which a collating application executable on a communication device is designed to dynamically access data stores maintained by applications for different communication channels. The collating application is provided with a display criteria and obtains message information related to the display criteria from the accessed data stores. The collating application displays the obtained message information to the user of the communication device.

According to another aspect of the invention, the above collating application is provided in which the display criteria is a sender identity and the obtained message information displayed by the collating application relates to the sender identity.

According to another aspect of the invention there is provided a program product for execution on a communications device for receiving, storing and displaying heterogeneous messages from different communications channels, the messages being received via different communications channels being received in formats specific to each communications channel, the communications device being capable of executing a plurality of message applications, each message application being associated with one of the communications channels and being executable to store and display messages received from the associated communications channel, the program product including a medium having executable program code embodied in the medium, the executable program code including a collating application, the executable program code including a collating application being executable on the communications device for dynamically retrieving heterogeneous messages stored by the plurality of message applications, the retrieved messages meeting at least one collating criterion, and for displaying an ordered listing of message fragments associated with at least one of said retrieved messages in a single view on the communications device.

According to another aspect of the invention there is provided the above program product in which the executable program code further includes program code executable on the communications device for enabling a user to specify the matching criteria.

According to another aspect of the invention there is provided the above program product in which the executable program code for enabling a user to specify the matching criteria includes executable program code for enabling the user to specify the matching criteria used to match entries in an address book maintained by the communications device.

According to another aspect of the invention there is provided the above program product in which the specified matching criteria including a name associated with one entry in the address book.

According to another aspect of the invention there is provided the above program product in which the executable program code further includes program code executable on the communications device for displaying a defined icon representing the matching criteria.

According to another aspect of the invention there is provided the above program product in which the executable program code further includes program code executable on the communications device for displaying a first defined icon representing the matching criteria when the communications device is in receipt of no unread messages meeting the matching criteria and for displaying a second defined icon representing the matching criteria when the communications device is in receipt of at least one unread message meeting the matching criteria.

According to another aspect of the invention there is provided the above program product in which the executable program code further includes program code executable on the communications device for enabling a user to select between alternative views for presenting the listing of the retrieved messages.

According to another aspect of the invention there is provided the above program product in which the executable program code further includes program code executable on the communications device for displaying a listing of the retrieved messages in sub-lists under displayed headings, each heading reflecting the communications channel on which the messages in the associated sub-list were received by the communications device.

According to another aspect of the invention there is provided the above program product in which the executable program code further includes program code executable on the communications device for enabling a user to launch the message application associated with one of the communications channels by selecting one of the displayed sub-list headings.

According to another aspect of the invention there is provided a method for a communications device to display a listing of heterogeneous messages, the communications device being capable of executing a plurality of message applications, each message application being associated with one of a plurality of communications channels and being executable to store and display messages received from the associated communications channel, the method including the steps of a collating application, executing on the communications device, dynamically applying at least one collating criterion to messages stored by the plurality of message applications, the collating application dynamically retrieving heterogeneous messages meeting the at least one collating criterion, and displaying an ordered listing of message fragments associated with at least one of said retrieved messages in a single view on the communications device.

According to another aspect of the invention there is provided the above method further including the steps of displaying a first defined icon representing the matching criteria when the communications device is in receipt of no unread messages meeting the matching criteria and of displaying a second defined icon representing the matching criteria when the communications device is in receipt of at least one unread message meeting the matching criteria.

The present invention thus permits the listing of heterogeneous messages from the same sender or group of senders in a single view. The user of the communication device is not required to access different applications to determine what messages have come from a defined sender. The collating application provides for a single display with all messages from the defined sender. More generally, the present invention permits other criteria to be selected by the user to define the characteristics of the potentially heterogeneous messages that are displayed in a single, collated view.

BRIEF DESCRIPTION OF THE DRAWINGS

In drawings which illustrate by way of example only a preferred embodiment of the invention.

DETAILED DESCRIPTION OF THE INVENTION

The preferred embodiment is described with respect to a wireless electronic mobile communication device capable of receiving messages from different communications channels. The communication device of the example used to illustrate the preferred embodiment is able to accept e-mail messages, telephone messages, IM messages and SMS messages. These different types of messages are heterogeneous as they are delivered in formats that are specific to each type of message and which are different from each other. Although the wireless device of the preferred embodiment may receive such messages using the same wireless network, the formats of the data for these heterogeneous messages differ from each other.

Figure 1:
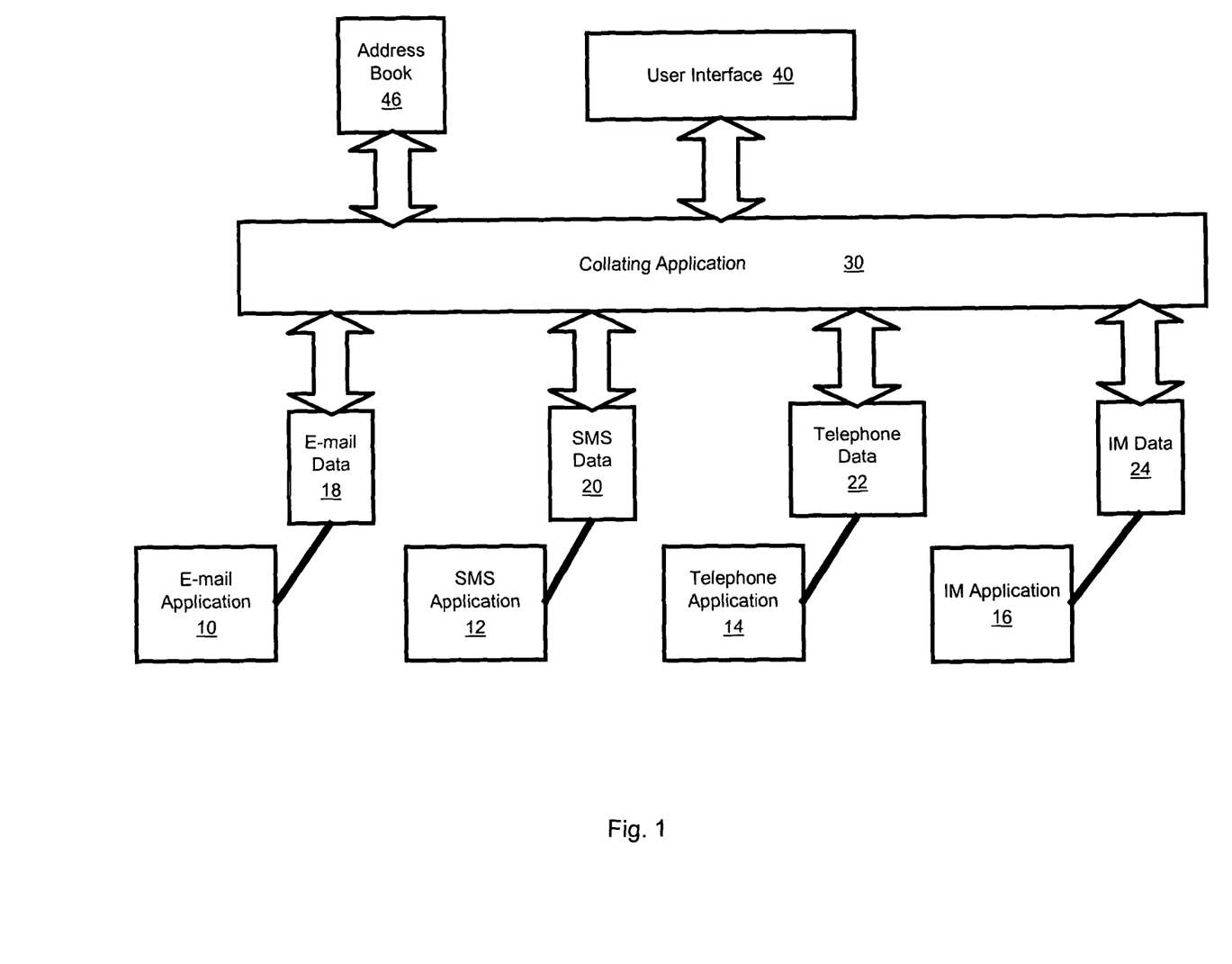
FIG. 1 is a block diagram showing a high-level representation of an example arrangement of applications according to the preferred embodiment.

FIG. 1 is a block diagram that shows a high level representation of an example used to illustrate the preferred embodiment. The example of FIG. 1 shows specific applications for the display and management of each of the types of messages receivable by an example communication device. Thus in FIG. 1 there is shown e-mail application 10, SMS application 12, telephone application 14, and IM application 16. In the example of FIG. 1; each application has an associated set of data that represents messages and related information used by the system of the mobile communication device. Each set of data is maintained in a data store in the communication device. Thus there are the following application-data pairs: e-mail application 10, e-mail data 18; SMS application 12, SMS data 20; telephone application 14, telephone data 22; and IM application 16, IM data 24. In each case, the application includes executable code that accesses the associated data store to store, update and retrieve data relating to communications to be sent and/or received from the communication device. Similarly, each of the different applications 10, 12, 14, 16 has its own view that is available to the user on the display of the device to display and manage the messages of the type associated with the application.

The communication device of the preferred embodiment also includes collating application 30. This application is executable on the communication device to allow the user to access messages from different communications channels using a single view. As is shown in FIG. 1, application 30 is able to access data for all supported communication types. In the example, application 30 dynamically accesses e-mail data 18, SMS data 20, telephone data 22, and IM data 24. Application 30 interacts with user interface 40 to display lists of heterogeneous messages to the user of the communication device.

As will be appreciated by those skilled in the art, application 30 may be delivered to the communications device and/or stored on the communications device as all or part of a program product embodied in a medium such as a magnetic or optical storage medium or a modulated carrier medium. For example, application 30 may be downloaded to the wireless communications device of the preferred embodiment using a wireless radio frequency network. In the preferred embodiment, application 30 is implemented as program code that is executable on the communications device.

As is described in more detail, below, application 30 in the preferred embodiment permits the user to display messages based on the identity of the sender or on another defined criteria. However, application 30 also includes logic to permit the user to define one or more message criteria used to display heterogeneous messages. Typically, the criteria will be the identity of an individual who is in the address book of the communication device. For example, the user may wish to view all messages from a sender "Mary Johnson". Application 30 provides, in conjunction with user interface 40, the ability for the user to specify an entry in address book 46 as a collating criterion. For example, the user selects the "Mary Johnson" entry from address book 46 and specifies that this selected entry will be used to collate all messages in a single view. In the preferred embodiment, collating application 30 permits the user to associate an icon with Mary Johnson (for display on a screen that is part of the communication device). Once the user has defined the "Mary Johnson" address book entry to be a collating entry, application 30 will commence a dynamic interrogation of messages in data stores containing data 18, 20, 22, 24 to determine which messages are associated with Mary Johnson.

As will be appreciated by those skilled in the art, the integration of application 30 into the system of the communication device involves implementation choices that relate to the existing architecture of the hardware and software of the device. For example, the logic permitting a user to specify an entry in address book 46 to be a collating entry may be coded as a modification to an address book manager application, or may be coded as part of application 30, itself.

Figure 2:
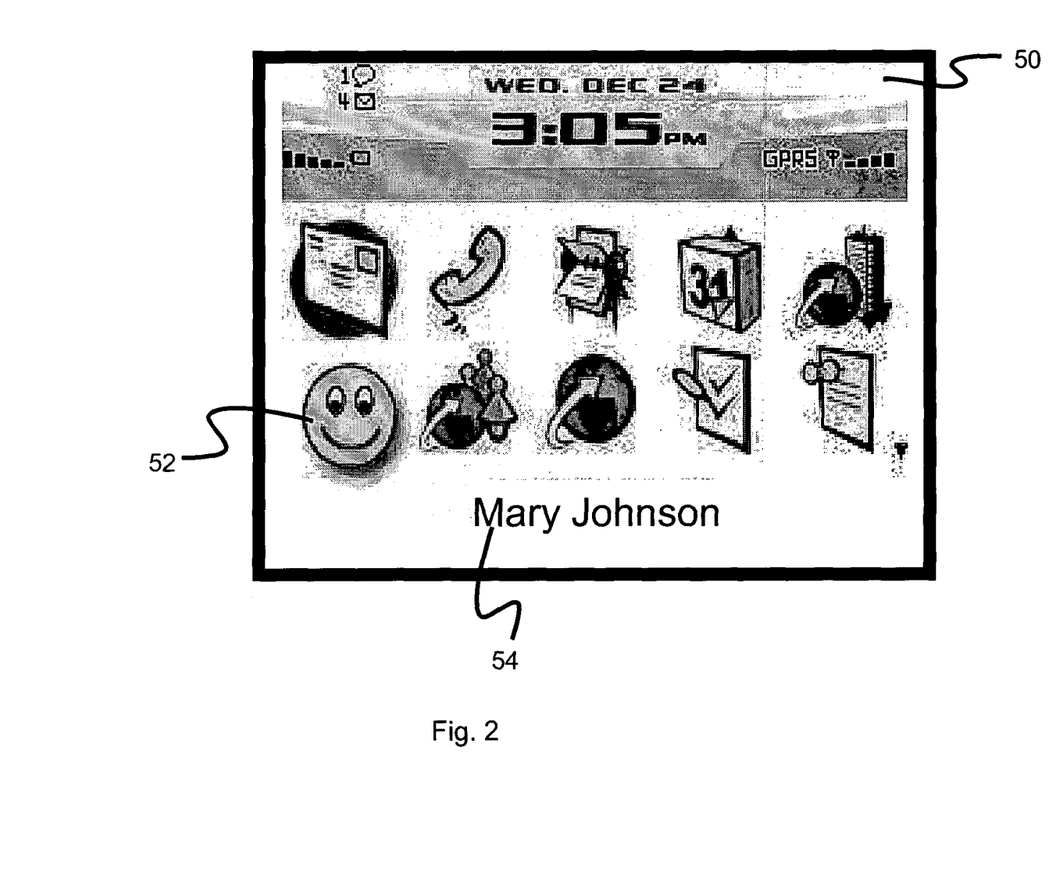
FIG. 2 is an example screen-shot showing the display of a communication device according to the preferred embodiment.

An example of how a collating icon appears on the communication device display of the preferred embodiment is shown in the screen shot of an example communication device screen 50 of FIG. 2. Icon 52 is shown in a set of icons displayable on the screen for the communication device of the preferred embodiment. As described above, icon 52 has been defined by the user to represent the "Mary Johnson" entry in address book 46. In the communication device of the preferred embodiment, the user is provided with a pointing device that is manipulated using a roller. When the user rolls over icon 52, the associated name 54, "Mary Johnson" is displayed. The example shown in FIG. 1 places the associated name 54 at the bottom of screen 50. In other embodiments associated name 54 might appear at other locations, for example at the top of screen 50.

According to the preferred embodiment, the user is able to request that a collating icon, such as icon 52, appear on a main icon application screen, such as screen 50 shown in FIG. 2. Icon 52 appears on the main screen 50 due to an entry made in address book 46 for "Mary Johnson" that defines icon 52 (and the associated name 54) as the icon (and name) to appear on main screen 50. In the preferred embodiment, an application executing on the communication device carries out the function of defining and displaying main screen 50. This application (not shown in FIG. 1) finds the "Mary Johnson" entry in address book 46 and consequently includes icon 52 in the main screen 50 view. In the preferred embodiment, application for defining and displaying main screen 50 searches address book 46 on startup or during regular intervals.

Figure 3:
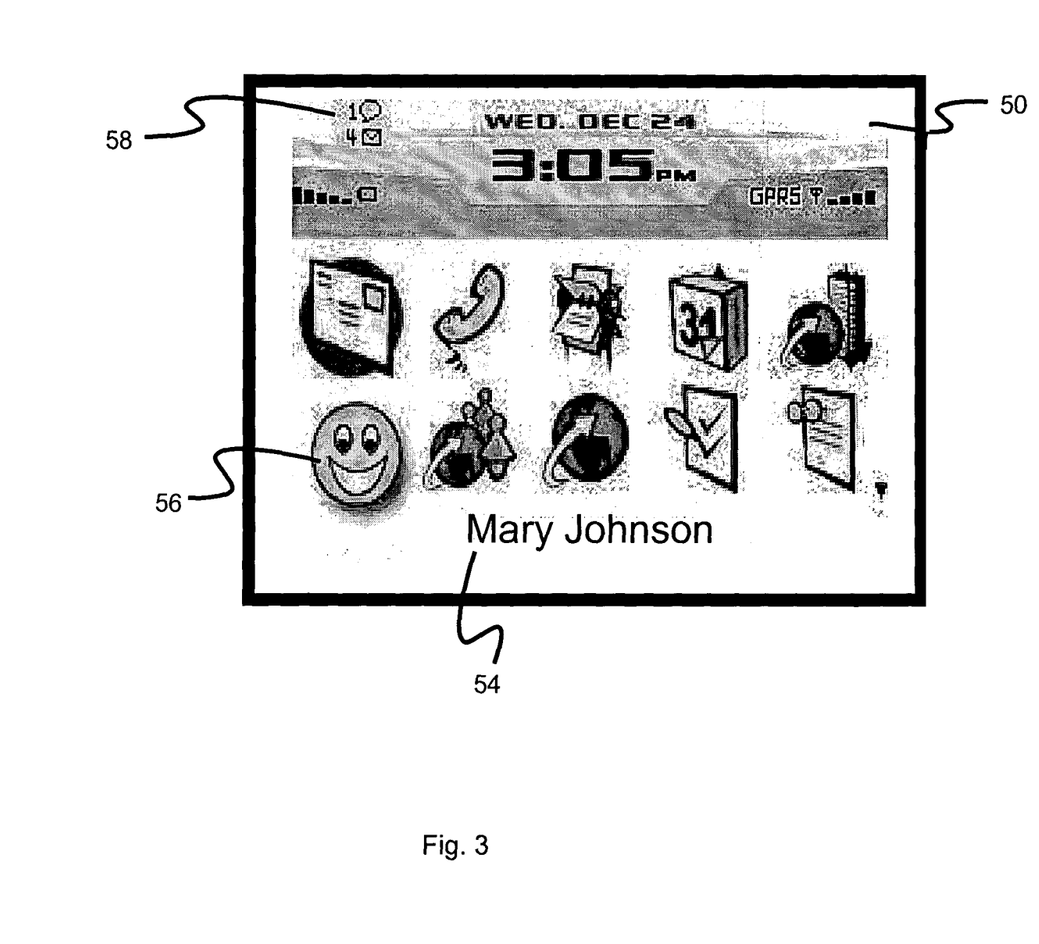
FIG. 3 is an example screen-shot of the display of FIG. 2, with an altered icon in the display.

As described above, collating application 30 dynamically determines which messages are related to a defined collating criteria, such as the address book entry for "Mary Johnson" in the example given. As part of this process, collating application 30 also determines when new messages have arrived that are associated with the collating criteria. The effect of newly received messages is shown with reference to the screen shot of main screen 50 shown in FIG. 3. In the example of FIG. 3, icon 52 shown in FIG. 2 has been replaced by icon 56. As is shown in the example, when a new message matching the collating criteria is received by the communication device, there is a change to the icon on the screen to indicate the receipt of the new message. The example of FIG. 3 shows icon 56, a modified version of icon 52. FIG. 3 also shows count indicators 58 that show the number of unread messages received by the communication device. The figure shows an envelope icon representing unread e-mail and a speech balloon icon representing unread IM messages. The FIG. 3 example thus shows seven unread IM messages and three unread emails in count indicators 58.

The change of screen 50 to modify icon 52 by replacement with icon 56 is dynamically carried out without user intervention or action. Icon 56 indicates to the user that a message from Mary Johnson has been received and is waiting to be viewed. In the example of FIG. 3, icon 56 does not give the user information to indicate the type of message received. As will be apparent, other visual cues other than a change in the icon, are possible to show that a message has been received from Mary Johnson. Such cues may specify the type of message. However, the change in icon is a simple and straightforward way to provide a visual cue indicating the arrival of a new message.

The preferred embodiment permits a user to select icon 52 or icon 56 (the type of selection method depends on the details of the communication device and may include a touch screen interface, a keystroke, use of a roller, or a different proprietary input method). Upon selection of icon 52, or icon 56, the preferred embodiment causes an activation menu to be displayed. One of the options made available to the user in the activation menu shown after selecting icon 52 or 56 is a collation screen display option.

Figure 4:
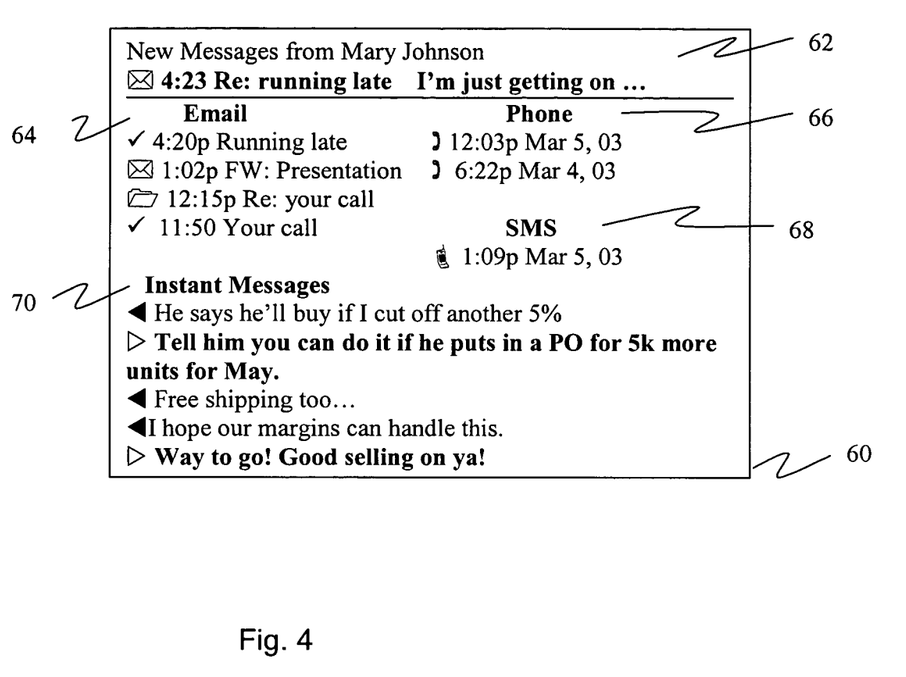
FIG. 4 is an example schematic representation of the display of a communication device displaying lists of heterogeneous messages, according to the preferred embodiment.

FIG. 4 is a schematic representation of a collation screen 60 made available by collating application 30 and user interface 40 in the preferred embodiment. In the example of FIG. 4, there are five different areas in collation screen 60. New message area 62 is located at the top of collation screen 60. Email area 64, telephone area 66, SMS area 68 and IM area 70 are arranged under new message area 62. The FIG. 4 example collation screen 60 shows messages to or from Mary Johnson. The schematic representation of FIG. 4 shows each of areas 62, 64, 66, 68, 70 with a relevant heading and a related sub-list of messages. Other display choices may be available, based on configuration selections made by the user and on the available display options for the communication device. Collation screen 60 lists heterogeneous messages related to the collation criteria selected by the user (in the example of FIG. 4, the collation criterion is the address book entry "Mary Johnson").

As is referred to above, the information listed in collation screen 60 is obtained by collating application 30 obtaining information from the appropriate data for the different messages, as maintained in the communication device. As shown in FIG. 4, the type of message may be indicated to the user by its location on a list in one of the separate areas set out on collation page 60. Further, different icons are shown representing different types of messages (for example, a telephone handset icon is shown for each telephone message listed in telephone area 66). The user is able to view all messages recently received that match the collation criteria. In the example of FIG. 4, the user is able to view a list of all messages recently received from Mary Johnson in a simple coordinated structure. The user is able to roll to any message and select it to view the entire message. In the preferred embodiment, each area (for example email area 64) has its own scroll functionality so that the list in that area can be scrolled while the other areas remain frozen. This permits the display of further conversation history beyond what is first displayed to the user in collation screen 60.

As may be seen from the example of FIG. 4, the view of collation screen 60 is primarily designed to give the user a summary of communications meeting one or more criteria. For additional information about the communications shown on the lists of collation screen 60, the user is able to view the full message by selecting it (as described above). Further, the user may select one of the headings shown to launch or switch the display to a menu screen for the associated application. For example, the user may select the "Email" title in email area 64 to launch or revert to the menu provided by email application 10. In this way, collation screen 60 is usable to permit the user to move between different application interfaces.

Figure 5A:
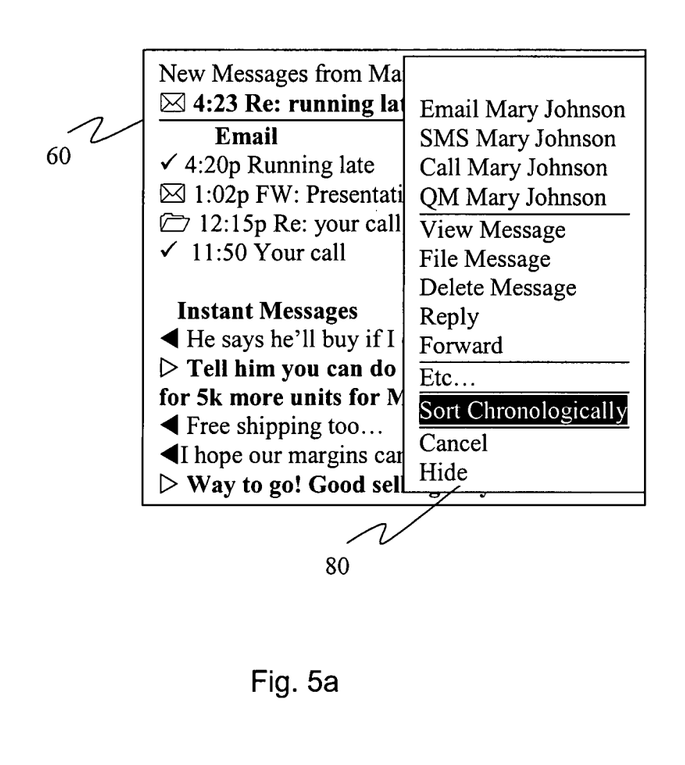
FIG. 5a is an example schematic representation of the display of a communication device showing a user-invoked menu, according to the preferred embodiment.

As is apparent from the above, in the preferred embodiment, collating application 30 obtains the information for collation screen 60 and dynamically updates the information by accessing data for different applications to obtain information about received and sent messages. Collating application 30 also provides for differing display formats. FIG. 5a is a schematic representation of a screen showing both collation screen 60 and an overlaid menu pane 80. Menu pane 80 provides a list of actions for a given highlighted message on collation screen 60. The list includes a first section listing the different message applications available for the user for the collation criteria ("Mary Johnson" in the example of the preferred embodiment). Menu pane 80 includes choices to launch or switch to the email, SMS, telephone, and IM applications. When one of these applications is selected, information relating to the collation criteria is passed to the application. For this example, the selection of "Email Mary Johnson" will result in the email application running and a new email message will be shown with recipient information set to Mary Johnson's email address.

The second section of menu pane 80 provides standard manipulation options for the selected message. In the FIG. 4 example, these include view, file, delete, rely and forward, each of which actions may be selected and if selected will be applied to the message by application 30 passing the relevant information to the appropriate message application. The user will then be provided with a display defined by the message application with the information completed to the extent possible. For example, if "Reply" is selected from an email message shown in screen 60, the e-mail application will be executed and a Reply screen with the e-mail address for Mary Johnson in the recipient field will be displayed.

Figure 5B:
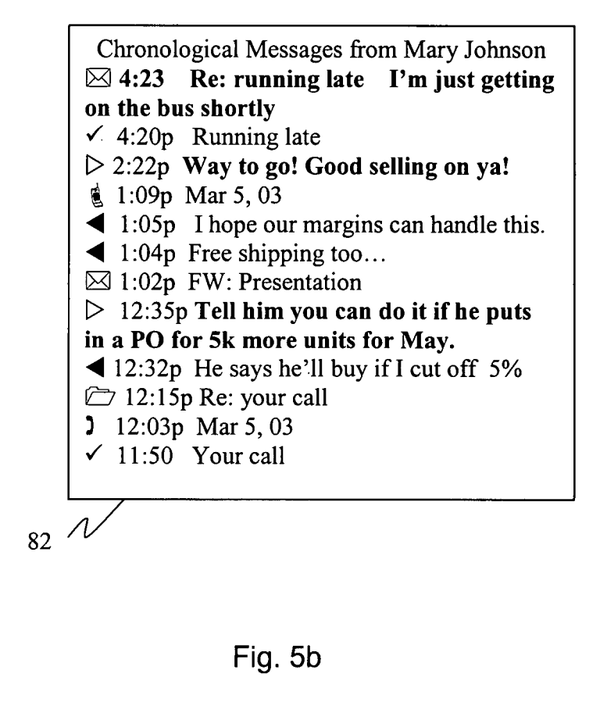
FIG. 5b is an example schematic representation of the display of a communication device showing a list of messages as displayed following a user-invoked sort, according to the preferred embodiment.

Menu pane 80 also provides the user with the option of selecting a chronological view for the collated messages. This view is represented in the schematic diagram of FIG. 5b. This figure shows chronological collation screen 82 in which recent messages for Mary Johnson are shown in a single list sorted chronologically. As was the case with collation screen 60, chronological collation screen 82 lists heterogeneous messages relating to Mary Johnson. The messages are shown as being related to different types of communication channels by one of a set of small icons associated with each message listed (shown to the left of each message fragment in FIG. 5b). Although not shown in the example of FIG. 5a, other views of collated messages are possible. For example, in a different implementation a user is able to invoke views where the messages are sorted by send items, received items, and other characteristics of messages. Such views are defined by the user and the user retains the ability to view heterogeneous messages in the same view, without the necessity of changing from one message application to another. Such views summarize a conversational paradigm as applied to arbitrary channels of message delivery. The back and forth between the user and another individual (or group) is captured in the collation views made available by the preferred embodiment.

The above example illustrates the use of an address book entry to act as the collating criterion for the collated view of messages on the communication device. As will be appreciated by those skilled in the art, other characteristics of messages may be specified as collating criteria. For example, all messages received from a set of individuals, all messages received on a specified date, or all messages that contain a certain text string, may be displayed by the communication device, if the appropriate collating criteria is defined. Collating application 30 accesses the data store or stores in which message data is maintained and the application permits a user to specify any criteria common to the messages by which they may be filtered, to allow for a collated view of heterogeneous messages.

Different implementations of the preferred embodiment may constrain the user's flexibility in defining collation criteria to a greater or lesser degree, depending on design requirements. A sophisticated collation criterion may require more processing power and device memory to be implemented.

Various embodiments of the present invention having been thus described in detail by way of example, it will be apparent to those skilled in the art that variations and modifications may be made without departing from the invention. The invention includes all such variations and modifications as fall within the scope of the appended claims.

What is claimed is:

1. A method, comprising:
receiving a plurality of messages of different message types at a communication device from a plurality of senders;
displaying a main application screen on the communication device, the main application screen comprising a plurality of icons each associated with a different application;
displaying, in the main application screen:
a first icon associated with a selected one of the plurality of senders when there are no new unread messages stored at the communication device associated with the selected sender; and
a second icon associated with the selected sender in place of the first icon upon receipt of a new message at the communication device from the selected sender; and
displaying, in a further screen on the communication device, a plurality of messages in a plurality of message listings associated with the selected sender in a plurality of message areas, the plurality of messages being of different message types,
each message listing and each message area being associated with a distinct one of the different message types, each message area comprising an indicator of the associated message type and a corresponding message listing, and each message listing comprising at least one indicator of at least one message associated with the selected sender of the associated message type,
the plurality of message areas including a new message area, the new message area comprising an indication of a newly received message associated with the selected sender and of any one of the different message types, at least a portion of the newly received message, and an indication of the message type for that newly received message.

2. The method of claim 1, wherein the further screen comprises at least five message areas, wherein at least two of the message areas are horizontally separated and at least two of the message areas are vertically separated.

3. The method of claim 2, wherein one of the two vertically separated message areas is positioned below the two horizontally separated messages on the further screen.

4. The method of claim 1, further comprising launching an application associated with one of the message types in response to a selection of the message area associated with said message type.

5. The method of claim 4, wherein the indicator of the associated message type comprises a textual heading and selection of the message area comprises a selection of the textual heading of said message area.

6. The method of claim 1, wherein the indicator of the associated message type comprises a textual heading.

7. The method of claim 1, wherein the different message types are selected from email, instant messaging, short message service, and voicemail.

8. The method of claim 1, wherein the at least one indicator of the at least one message comprises textual content from the at least one message.

9. The method of claim 8, wherein the at least one indicator of the at least one message further comprises a time associated with said message.

10. The method of claim 1, wherein the plurality of message listings represent both messages sent from and messages received at the communication device.

11. The method of claim 1, wherein at least one of the message areas comprises a plurality of indicators, the method further comprising scrolling through the plurality of indicators on the further screen.

12. The method of claim 1, further comprising storing each of the received plurality of messages in a corresponding one of a plurality of message stores, each message store being associated with a different message type, and wherein displaying the plurality of messages comprises retrieving message data for messages associated with the selected sender from each of the plurality of message stores, each of the at least one indicator of at least one message comprising retrieved message data for that message.

13. The method of claim 1, further comprising updating the further screen upon receipt of a new message from the selected sender.

14. The method of claim 1, wherein the communication device is a wireless mobile communication device.

15. A computer program product comprising a non-transitory computer-readable medium storing code executable to cause a communication device to carry out the method of:
receiving a plurality of messages of different message types at a communication device from a plurality of senders;
displaying a main application screen on the communication device, the main application screen comprising a plurality of icons each associated with a different application;
displaying, in the main application screen:
a first icon associated with a selected one of the plurality of senders when there are no new unread messages stored at the communication device associated with the selected sender; and
a second icon associated with the selected sender in place of the first icon upon receipt of a new message at the communication device from the selected sender; and
displaying, in a further screen on the communication device, a plurality of messages in a plurality of message listings associated with the selected sender in a plurality of message areas, the plurality of messages being of different message types,
each message listing and each message area being associated with a distinct one of the different message types, each message area comprising an indicator of the associated message type and a corresponding message listing, and each message listing comprising at least one indicator of at least one message associated with the selected sender of the associated message type,
the plurality of message areas including a new message area, the new message area comprising an indication of a newly received message associated with the selected sender and of any one of the different message types, at least a portion of the newly received message, and an indication of the message type for that newly received message.

16. The computer program product of claim 15, wherein the further screen comprises at least five message areas, wherein at least two of the message areas are horizontally separated and at least two of the message areas are vertically separated.

17. The computer program product of claim 16, wherein one of the two vertically separated message areas is positioned below the two horizontally separated messages on the further screen.

18. The computer program product of claim 15, wherein the method further comprises launching an application associated with one of the message types in response to a selection of the message area associated with said message type.

19. The computer program product of claim 18, wherein the indicator of the associated message type comprises a textual heading and selection of the message area comprises a selection of the textual heading of said message area.

20. The computer program product of claim 15, wherein the indicator of the associated message type comprises a textual heading.

21. The computer program product of claim 15, wherein the different message types are selected from email, instant messaging, short message service, and voicemail.

22. The computer program product of claim 15, wherein the at least one indicator of the at least one message comprises textual content from the at least one message.

23. The computer program product of claim 22, wherein the at least one indicator of the at least one message further comprises a time associated with said message.

24. The computer program product of claim 15, wherein at least one of the message areas comprises a plurality of indicators.

25. The computer program product of claim 15, wherein the plurality of message listings represent both messages sent from and messages received at the communication device.

26. The computer program product of claim 24, wherein the method further comprises scrolling through the plurality of indicators on the further screen.

27. The computer program product of claim 15, wherein the method further comprises storing each of the received plurality of messages in a corresponding one of a plurality of message stores, each message store being associated with a different message type, and wherein displaying the plurality of messages comprises retrieving message data for messages associated with the selected sender from each of the plurality of message stores, each of the at least one indicator of at least one message comprising retrieved message data for that message.

28. The computer program product of claim 15, wherein the method further comprises updating the further screen upon receipt of a new message from the selected sender.

29. The method of claim 1, wherein the further screen comprises at least three message areas, two of the message areas being horizontally separated and two of the message areas being vertically separated, and wherein the new message area is disposed along a top portion of the further screen.

30. The computer program product of claim 15, wherein the further screen comprises at least three message areas, two of the message areas being horizontally separated and two of the message areas being vertically separated, and wherein the new message area is disposed along a top portion of the further screen.

* * * * *